Aug. 29, 1944.     F. R. MARONEK     2,357,215
PILOT CONTROL VALVE FOR GAS HEATERS
Filed Jan. 28, 1941
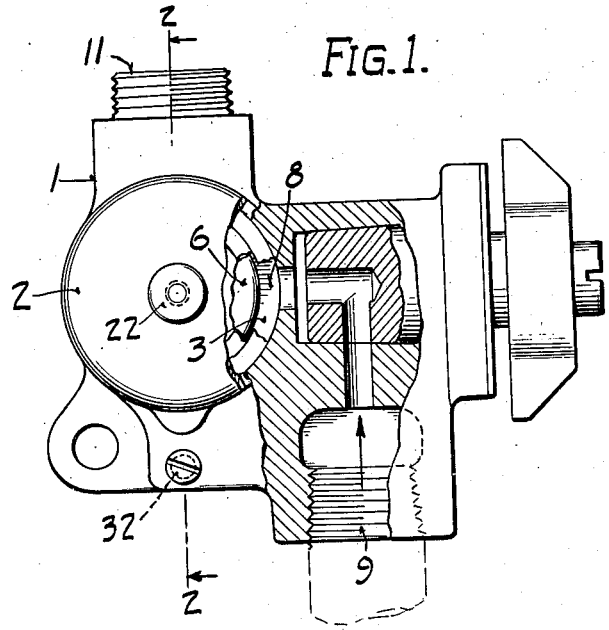
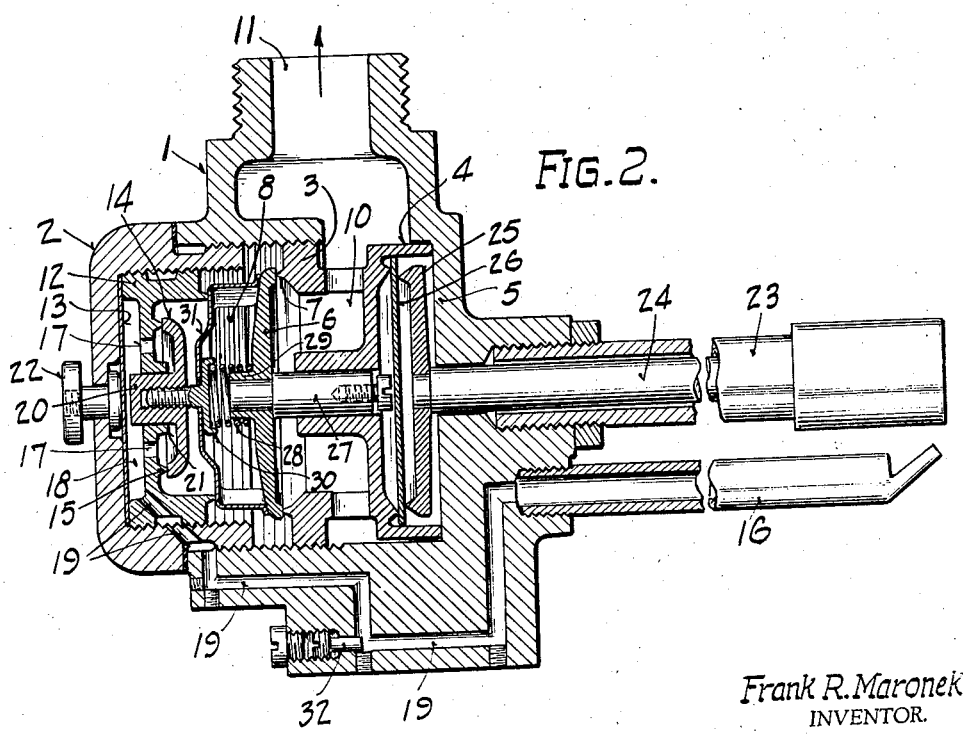
Frank R. Maronek
INVENTOR.
BY
ATTORNEY.

Patented Aug. 29, 1944

2,357,215

UNITED STATES PATENT OFFICE 2,357,215

PILOT CONTROL VALVE FOR GAS HEATERS

Frank R. Maronek, Whitefish Bay, Wis., assignor to A. O. Smith Corporation, Milwaukee, Wis., a corporation of New York Application January 28, 1941, Serial No. 376,345

9 Claims. (Cl. 158—117.1)

This invention relates to a pilot control valve for gas heaters.

It has been applied to the control of gas burners used in domestic water heating units and provides a one hundred per cent safety shut off in the event that the pilot flame becomes extinguished.

The object of the invention is to provide a pilot control of this kind with a snap valve action.

Another object is to provide a simple and more certain control which can be operated manually for starting the pilot and will automatically maintain the main gas supply to the burner and pilot only when the pilot thermostat is subjected to heat.

Other objects will be apparent from the description of a preferred embodiment illustrated in the accompanying drawing.

In the drawing Figure 1 is a front elevation, partly in section, of a gas control unit embodying the invention; and Fig. 2 is an enlarged sectional view through the valve chamber and parts of the control, taken on line 2—2 of Fig. 1.

The valve comprises an outer casing 1 having a cylindrical valve chamber therein closed at the end by the threaded cap 2.

The main valve body 3 is threaded into the valve chamber and has a skirt 4 seated against the end wall 5 of the chamber. A disk valve 6 seats upon a circumferential rim 7 of the body 3 to close the valve and stop the flow of gas through the same. To the left of disk 6, Fig. 2, is the gas supply section 8 of the valve chamber which receives gas from the supply line 9, shown in Fig. 1. To the right of valve disk 6, Fig. 2, is the chamber 10 in the valve body 3 which connects with an outlet port 11 in the outer casing 1 leading to the main control valve and burner (not shown).

In cap 2 is a pilot valve body 12 threaded in place against a flexible sealing disk 13 in the cap. A valve disk 14 seats on a circular rim 15 on the valve body 12 to stop the flow of gas from the gas supply section 8 to the pilot 16. The valve body 12 has ports 17 leading from the valve disk 14 to a small chamber 18 between it and disk 13, and passage 19 leads from chamber 18 through body 12, cap 2 and casing 1 to the pilot burner 16.

The valve disk 14 has a central projection 20 extending through a central bearing 21 in the body 12 into chamber 18 and adapted to be pressed by disk 13 to move the valve disk 14 off from its seat 15. This is accomplished manually by means of a push button 22 extending through cap 2 and adapted to be pushed by hand to press disk 13 against the projection 20.

The manual unseating of valve disk 14 is for the purpose of supplying gas to the pilot during lighting. After lighting the pilot flame heats a thermostat 23 which then operates to automatically maintain the valve disk 14 unseated, as later described, and thereby allows release of button 22.

The thermostat 23 is preferably of standard construction and has a central rod 24 disposed axially of the valves and supporting a plunger 25 on its end within the casing 1. The plunger engages a disk 26 which is so mounted within the skirt 4 as to amplify the movement of rod 24. When heated from the pilot flame the rod 24 expands in length and moves the plunger 25 against the disk 26 which amplifies said movement and quickly moves disk 6 off from its seat 7, thereby supplying gas from chamber 8 to chamber 10 leading to the main burner through port 11. The disk 6 is supported upon a stud 27 mounted for axial movement in a central bearing in body 3.

The valve disks 6 and 14 are held normally seated by a coil spring 28 which biases the disks in opposite directions. The coil spring 28 is centered with respect to the disk 6 by a central projection 29 on the disk, and with respect to the disk 14 by a flanged head 30 in which the spring seats and which has an axial shank threaded into disk 14 for adjustment.

For the purpose of retaining the pilot valve open when the main valve is opened by thermostat 23, the invention provides a spring 31 in the form of a wire, ribbon, or perforated disk-like member which has its central part bearing against head 30 and its outer ends or edge loosely bearing on the sloping side of the valve disk 6. The spring 31 is bent at approximately right angles to form a U or cup shape with a substantially flat web supported near its outer periphery against the inner edge of the valve body 12. When disk 6 moves off from its seat it presses the ends of spring 31 outwardly and by lever action of the spring with the inner edge of body 12 as a fulcrum, it draws head 30 toward the right against the coil spring 28, and holds valve disk 14 off from its seat.

Should the pilot flame become extinguished, the rod 24 shortens allowing disk 6 to become seated and spring 31 to snap back into normal position which causes seating of the pilot valve disk 14 by the pressure of coil spring 28. The gas supply thereafter remains shut off from both the main burner and the pilot until the latter is relighted manually as previously described.

For the purpose of adjusting the amount of gas supplied to the pilot flame, a screw plug 32 is disposed to restrict the passage 19 and can be manually adjusted for varying the restriction.

Various embodiments of the invention may be employed within the scope of the accompanying claims.

The invention is claimed as follows:

1. In a control for gas burners, a housing providing a valve chamber, an inlet port for gas into the central portion of said chamber, an outlet port at one end of the chamber for supplying gas to a burner, an outlet port at the opposite end of said chamber for supplying gas to another burner, a separate normally closed valve at each end of the chamber and interposed between the central portion of said chamber and the respective end outlet port, means for opening one of said valves independently of the other, and additional means for holding said independently operable valve open when the other valve is opened.

2. In a control for gas burners, a housing providing a valve chamber, an inlet port for gas into the central portion of said chamber, an outlet port at one end of the chamber for supplying gas to a burner, an outlet port at the opposite end of said chamber for supplying gas to another burner, a separate normally closed valve at each end of the chamber and interposed between the central portion of said chamber and the respective end outlet port, means for opening one of said valves independently of the other, additional means for holding said independently operable valve open when the other valve is opened, and means responsive to the heat of the burner supplied by said independently operable valve to open the valve supplying gas to the other burner.

3. In a valve control for gas burners, a housing providing a valve chamber, an inlet port for supplying gas to the central portion of said chamber, a separate valve body disposed in each end of the chamber and providing connections to separate outlet ports, valve members disposed to seat on the respective valve bodies to shut off the supply of gas from the central portion of the chamber to said outlet ports, means for biasing said valve members in opposite directions to hold them in normally closed position, and thermostatic means extending through one end of the housing for opening the respective valves against the pressure of said biasing means.

4. In a valve control for gas burners, a housing providing a valve chamber, an inlet port for supplying gas to the central portion of said chamber, a separate valve body disposed in each end of the chamber and providing connections to separate outlet ports, valve members disposed to seat on the respective valve bodies to shut off the supply of gas from the central portion of the chamber to said outlet ports, means for biasing said valve members in opposite directions to hold them in normally closed position, means extending through the opposite ends of the housing for opening the respective valves against the pressure of said biasing means, and means disposed between said valve members for holding one valve open when the other valve is open.

5. In a valve control for gas burners, a housing providing a valve chamber, an inlet port for supplying gas to the central portion of said chamber, a separate valve body disposed in each end of the chamber and providing connections to separate outlet ports, valve members disposed to seat on the respective valve bodies to shut off the supply of gas from the central portion of the chamber to said outlet ports, means for biasing said valve members in opposite directions to hold them in normally closed position, manually operable means extending through one end of the housing for temporarily opening the valve disposed in that end of the housing to supply gas to one of the burners for lighting, thermostatic means responsive to heat from said lighted burner and extending through the opposite end of said housing for opening the other valve to supply gas to a second burner, and means disposed between said valve members for holding said manually opened valve open when said other valve is opened by said thermostatic means.

6. In a control of the class described, a housing providing a cylindrically shaped valve chamber, an inlet port for supplying gas to the central portion of said chamber, an outlet port at one end of said chamber for supplying gas to a burner, an outlet port at the opposite end of the chamber for continuously supplying gas therethrough to another burner after said first named outlet port is initially opened, a pair of valve members normally biased away from each other and towards the opposite ends of the chamber for closing said separate outlet ports at the respective ends, and a reverse action spring member disposed between said valve members and having a fixed fulcrum to effect the holding of one valve open while the other valve is open.

7. In a control of the class described, a housing providing a cylindrically shaped valve chamber, an inlet port for supplying gas to the central portion of said chamber, an outlet port at one end of the chamber for supplying gas to a burner, an outlet port at the opposite end of the chamber for continuously supplying gas therethrough to another burner after said first named outlet port is initially opened, a pair of valve members normally biased away from each other and towards the opposite ends of the chamber for closing said separate outlet ports at the respective ends, manual means for opening one of said valves independently of the other, and a reverse action spring member disposed between said valve members and having a fixed fulcrum to effect the holding of said manually operable valve open while the other valve is open.

8. In a control of the class described, a housing providing a cylindrically shaped valve chamber, an inlet port for supplying gas to the central portion of said chamber, an outlet port for gas to the main heating burner, an outlet port for a continuous supply of gas therethrough to a pilot burner after said main burner is initially opened, a pair of valve members normally biased away from each other and towards the opposite ends of the chamber for closing said outlet ports, manual means for opening one of said valves independently of the other, a reverse action spring member disposed between said valve members and having a fixed fulcrum to effect the holding of said manually operable valve open while the other valve is open, and thermostatic means for opening said other valve in accordance with conditions to be controlled.

9. In a control of the class described, a housing providing a chamber, an inlet port to provide gas to said chamber, an outlet port to supply gas to a main burner, a valve in said chamber disposed to open and close said outlet port, an outlet passage in said chamber to supply gas to a pilot burner, a second valve in said chamber to open and close said outlet passage, manual means to initially open said second named valve to supply gas to the pilot burner, thermostatic means to open said first named valve, a reverse action spring member disposed between said valves and having a fixed fulcrum to effect the holding of said manually operable valve open after said manual means is released, to thereby provide a continuous supply of gas to the pilot burner by the same outlet passage through which gas was supplied by the said manual operation of the second named valve.

FRANK R. MARONEK.